US011074456B2

(12) United States Patent
Farre Guiu et al.

(10) Patent No.: US 11,074,456 B2
(45) Date of Patent: Jul. 27, 2021

(54) GUIDED TRAINING FOR AUTOMATION OF CONTENT ANNOTATION

(71) Applicant: Disney Enterprises, Inc., Burbank, CA (US)

(72) Inventors: Miquel Angel Farre Guiu, Bern (CH); Matthew Petrillo, Sandy Hook, CT (US); Monica Alfaro Vendrell, Barcelona (ES); Marc Junyent Martin, Barcelona (ES); Daniel Fojo, Barcelona (ES); Anthony M. Accardo, Los Angeles, CA (US); Avner Swerdlow, Los Angeles, CA (US); Katharine Navarre, Santa Monica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 183 days.

(21) Appl. No.: 16/352,601

(22) Filed: Mar. 13, 2019

(65) Prior Publication Data

US 2020/0151459 A1    May 14, 2020

Related U.S. Application Data

(60) Provisional application No. 62/767,368, filed on Nov. 14, 2018.

(51) Int. Cl.
*G06K 9/00* (2006.01)
*G06K 9/62* (2006.01)
(Continued)

(52) U.S. Cl.
CPC .......... *G06K 9/00751* (2013.01); *G06K 9/62* (2013.01); *G06K 9/6254* (2013.01);
(Continued)

(58) Field of Classification Search
CPC .... G06K 9/00751; G06K 9/62; G06K 9/6254; G06K 9/6255; G06K 9/6256;
(Continued)

(56) References Cited

U.S. PATENT DOCUMENTS 8,930,288 B2    1/2015   Toderici
9,619,758 B2 *  4/2017   Cheng .................... G06N 7/005
(Continued)

OTHER PUBLICATIONS

Borovicka, et al. "Selecting, Representative Data Sets," *Advances in Data Mining Knowledge Discovery and Applications.* Nov. 2011, pp. 43-70.

*Primary Examiner* — Kim Y Vu
*Assistant Examiner* — Molly Delaney
(74) *Attorney, Agent, or Firm* — Farjami & Farjami LLP (57) ABSTRACT

According to one implementation, a system for automating content annotation includes a computing platform having a hardware processor and a system memory storing an automation training software code. The hardware processor executes the automation training software code to initially train a content annotation engine using labeled content, test the content annotation engine using a first test set of content obtained from a training database, and receive corrections to a first automatically annotated content set resulting from the test. The hardware processor further executes the automation training software code to further train the content annotation engine based on the corrections, determine one or more prioritization criteria for selecting a second test set of content for testing the content annotation engine based on the statistics relating to the first automatically annotated content, and select the second test set of content from the training database based on the prioritization criteria.

27 Claims, 4 Drawing Sheets

(51) Int. Cl.
  *G06T 7/70* (2017.01)
  *G06T 7/60* (2017.01)
  *G06T 7/73* (2017.01)
  *G06T 7/174* (2017.01)
  *G06T 7/11* (2017.01)

(52) U.S. Cl.
  CPC ......... *G06K 9/6255* (2013.01); *G06K 9/6256* (2013.01); *G06T 7/60* (2013.01); *G06T 7/70* (2017.01); *G06T 7/11* (2017.01); *G06T 7/174* (2017.01); *G06T 7/73* (2017.01); *G06T 7/74* (2017.01)

(58) Field of Classification Search
  CPC ............... G06K 9/6253; G06K 9/6263; G06K 2209/27; G06K 9/00718; G06T 7/70; G06T 7/60; G06T 7/74; G06T 7/174; G06T 7/73; G06T 7/11
  See application file for complete search history.

(56) References Cited

U.S. PATENT DOCUMENTS

| | | | |
|---|---|---|---|
| 10,318,572 B2 * | 6/2019 | Kulesza | G06F 16/287 |
| 10,719,301 B1 * | 7/2020 | Dasgupta | G06F 8/33 |
| 2016/0253596 A1 * | 9/2016 | Goth, III | G06F 16/24578 706/12 |
| 2017/0147909 A1 * | 5/2017 | Izumi | G06K 9/6284 |
| 2017/0201779 A1 * | 7/2017 | Publicover | H04N 21/4532 |
| 2019/0354810 A1 * | 11/2019 | Samel | G06K 9/6219 |
| 2020/0202171 A1 * | 6/2020 | Hughes | G06K 9/6264 |
| 2021/0042580 A1 * | 2/2021 | Chen | G06T 1/20 |

* cited by examiner

GUIDED TRAINING FOR AUTOMATION OF CONTENT ANNOTATION

RELATED APPLICATIONS

The present application claims the benefit of and priority to Provisional Patent Application Ser. No. 62/767,368, filed Nov. 14, 2018, and titled "Content Selection for Machine Learning Training," which is hereby incorporated fully by reference into the present application.

BACKGROUND

Due to its nearly universal popularity as a content medium, ever more video is being produced and made available to users. As a result, the efficiency with which video content can be annotated and managed has become increasingly important to the producers of that video content.

For example, annotation of video is an important part of the production process for television (TV) programming and movies, and is typically performed manually by human annotators. However, such manual annotation, or "tagging", of video is a labor intensive and time consuming process. Moreover, in a typical video production environment there may be such a large number of videos to be annotated that manual tagging becomes impracticable. Consequently, there is a need in the art for an automated solution for annotating content that substantially minimizes the amount of content, such as video, that needs to be manually processed.

SUMMARY

There are provided systems and methods for automating content annotation, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for automating content annotation that overcome the drawbacks and deficiencies in the conventional art. In conventional approaches to training a content annotation engine, training datasets are typically drawn from a training database either in order, based on file name, for example, or through random sampling. As a result, conventional approaches may initially form inaccurate predictions at early stages of training, which may lead to model overfitting and delays in later convergence to more accurate results. Consequently, such conventional training may undesirably require a lengthy quality assurance (QA) process involving the extensive participation of human annotators.

The automation solution disclosed by the present application initially trains a content annotation engine using a set of labeled content, such as a set of manually annotated video files, for example, thereby avoiding the numerous early training inaccuracies often present in the conventional art. The content annotation engine is then tested using a first test set of content obtained from a training database, resulting in a first automatically annotated content set. The present solution also includes receiving corrections to the first automatically annotated content set and further training the content annotation engine based on those corrections. Moreover, by determining prioritization criteria for selecting subsequent test sets of content for testing the content annotation engine based on statistics relating to previous automatically annotated content sets, the present solution advantageously enables rapid improvement in the automated performance by the content annotation engine while also enhancing its ability to learn more complicated cases over time.

It is noted that, as used in the present application, the terms "automation," "automated", and "automating" refer to systems and processes that do not require human intervention. Although, in some implementations, a human editor or annotator may review or even modify annotations or "tags" applied to content by the automated content annotation engines described herein after their training, that human involvement is optional. Thus, after training, annotation of content by the content annotation engines described in the present application may be performed under the control of hardware processing components executing them.

Figure 1:
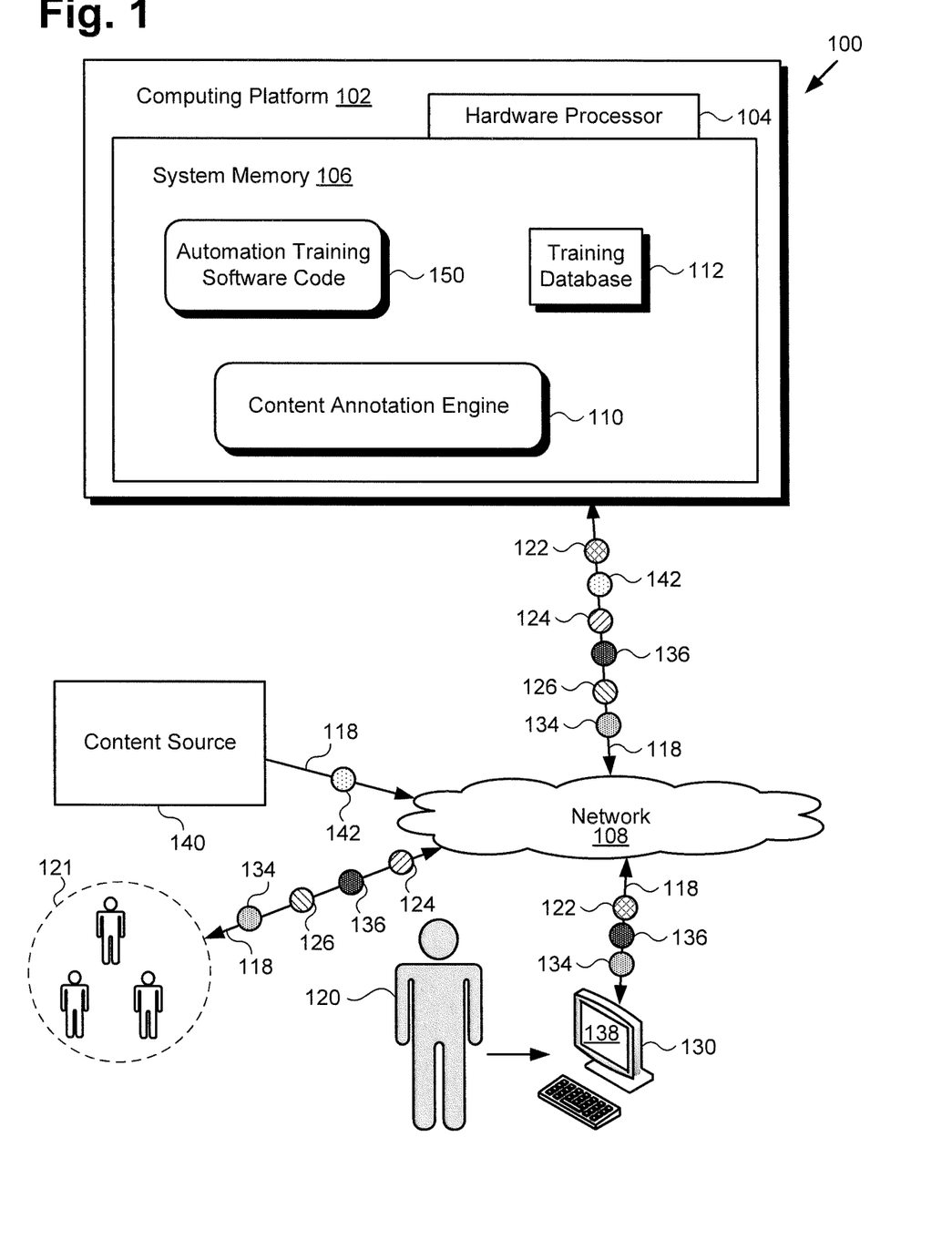
FIG. 1 shows a diagram of an exemplary system for automating content annotation, according to one implementation.

FIG. 1 shows a diagram of an exemplary system for automating content annotation, according to one implementation. System 100 includes computing platform 102 having hardware processor 104, and system memory 106 implemented as a non-transitory storage device. According to the exemplary implementation shown in FIG. 1, system memory 106 stores content annotation engine 110, training database 112, and automation training software code 150. Content Annotation engine 110 may comprise code for a machine learning model. As known in the art, a "machine learning model" may refer to a mathematical model for making future predictions based on patterns learned from samples of data or "training data." Various "learning algorithms" can be used to map correlations between input data and output data (e.g., classifications.) These correlations form the mathematical model that can be used to make future predictions on new input data. One type of learning algorithm includes "supervised learning" algorithms, which learn correlations between input data and output data from training data that is labeled.

It is noted that, although the present application refers to content annotation engine 110, training database 112, and automation training software code 150 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts content annotation engine 110, training database 112, and automation training software code 150 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud based system, for instance. As a result, hardware processor 104 and system memory 106 may correspond to distributed processor and memory resources within system 100. Thus, it is to be understood that content annotation engine 110, training database 112, and automation training software code 150 may be stored remotely from one another within the distributed memory resources of system 100.

Thus, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of private or limited distribution network.

It is also noted that although user system 130 is shown as a desktop computer in FIG. 1, that representation is provided merely as an example as well. More generally, user system 130 may be any suitable mobile or stationary computing device or system that implements data processing capabilities sufficient to implement the functionality ascribed to user system 130 herein. For example, in other implementations, user system 130 may take the form of a laptop computer, tablet computer, or smartphone, for example. Moreover, display 138 of user system 130 may be implemented as a liquid crystal display (LCD), a light-emitting diode (LED) display, an organic light-emitting diode (OLED) display, or another suitable display screen that performs a physical transformation of signals to light.

As shown in FIG. 1, system 100 is utilized within a content production environment including communication network 108, content source 140 providing content 142, user 120 utilizing user system 130 having display 138, and one or more human annotators 121. Also shown in FIG. 1 are network communication links 118, labeled content 122, first automatically annotated content set 134, corrections 124 to first automatically annotated content set 134, second automatically annotated content set 136, and corrections 126 to second automatically annotated content set 136.

As described herein, "labeled content" may refer to content that has been pre-annotated (e.g. initially tagged by human annotators 121 or by another automated annotation system.) As described herein, a "correction" to an annotated content set may refer to an action to remove, add, or change one or more tags automatically applied to content by the content annotation engine 110 during a testing and quality QA. In subsequent cycles of training the content annotation engine 110, the content (i.e. videos) that are sampled as training data may include annotated content for which corrections made in previous training cycles have been applied.

Figure 2:
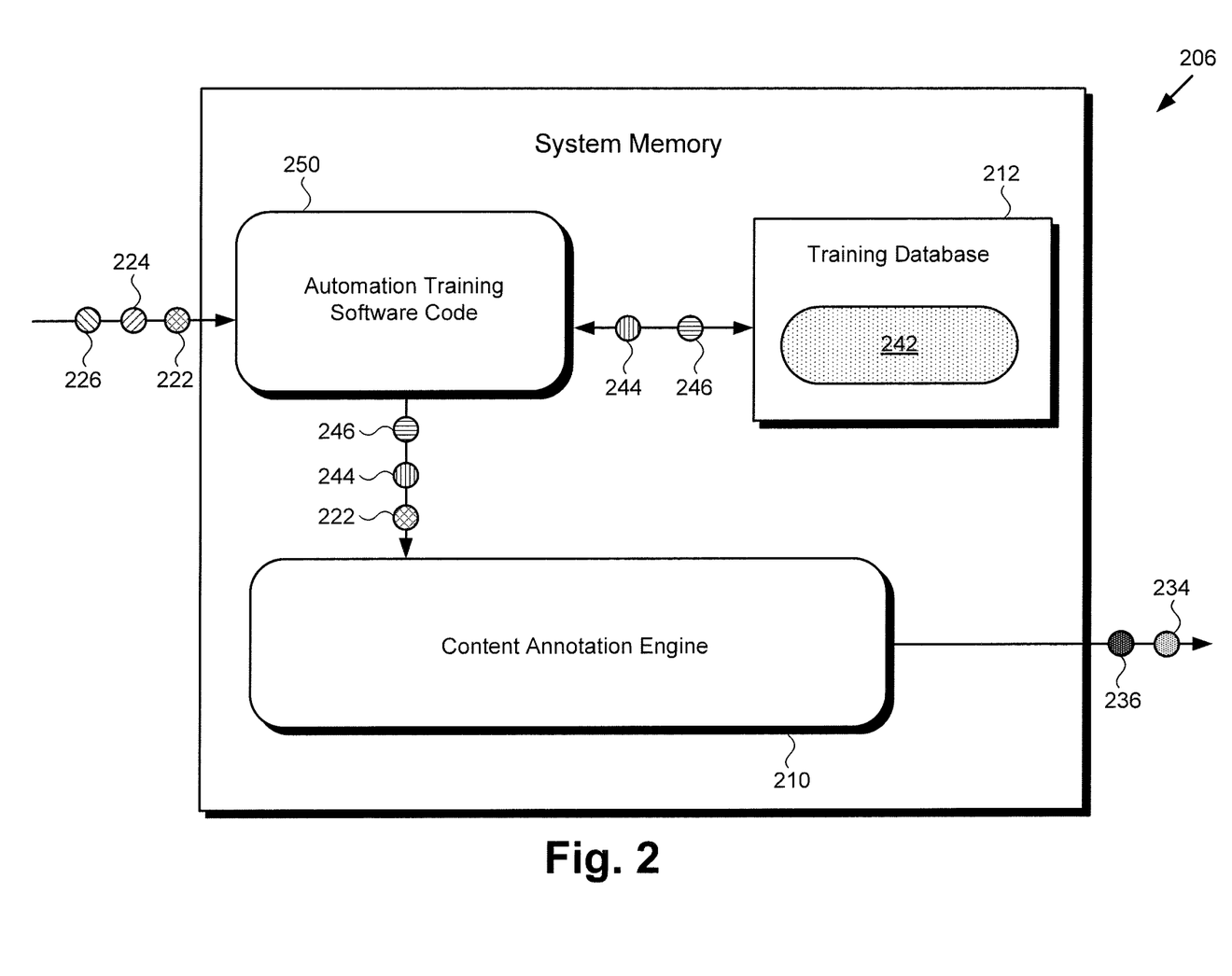
FIG. 2 shows a more detailed exemplary diagram of a portion of the system of FIG. 1, according to one implementation.

FIG. 2 shows a more detailed exemplary diagram of a portion of system 100, in FIG. 1, according to one implementation. FIG. 2 shows system memory 206 including content annotation engine 210, training database 212 storing content 242, and automation training software code 250. In addition, FIG. 2 shows labeled content 222, first automatically annotated content set 234, corrections 224 to first automatically annotated content set 234, second automatically annotated content set 236, and corrections 226 to second automatically annotated content set 236. Also shown in FIG. 2 are first and second test sets 244 and 246 of content used to test the automated performance of content annotation engine 210.

System memory 206, content annotation engine 210, training database 212, content 242, and automation training software code 250 correspond respectively in general to system memory 106, content annotation engine 110, training database 112, content 142, and automation training software code 150, in FIG. 1. Consequently, system memory 206, content annotation engine 210, training database 212, content 242, and automation training software code 250 may share any of the characteristics attributed to respective system memory 106, content annotation engine 110, training database 112, content 142, and automation training software code 150 by the present disclosure, and vice versa.

In addition, labeled content 222, first automatically annotated content set 234, and corrections 224 to first automatically annotated content set 234, in FIG. 2, correspond respectively in general to labeled content 122, first automatically annotated content set 134, and corrections 124 to first automatically annotated content set 134, in FIG. 1. That is to say, labeled content 222, first automatically annotated content set 234, and corrections 224 to first automatically annotated content set 234 may share any of the characteristics attributed to respective labeled content 122, first automatically annotated content set 134, and corrections 124 to first automatically annotated content set 134 by the present disclosure, and vice versa. Moreover, second automatically annotated content set 236 and corrections 226 to second automatically annotated content set 236 correspond respectively in general to second automatically annotated content set 136 and corrections 126 to second automatically annotated content set 136.

According to implementations of the invention, automation training software code 150/250 may store instructions for training content annotation engine 110/210 over cycles. In one implementation, training of content annotation engine 110/210 by automation training software code 150/250 includes the following virtuous training cycle:

1. Annotate or "tag" a set of videos to provide labeled content 122/222;
2. Train content annotation engine 110/210 with labeled content 122/222 including the existing tags;
3. Tag first test set 144/244 of content automatically using content annotation engine 110/210 to produce first automatically annotated content set 134/234, followed by a QA review represented by corrections 124/224, and which may be performed manually by user 120 and/or one or more human annotators 121. In this QA step, the human annotators may correct, i.e., modify or reject, or may accept tags proposed by content annotation engine 110/210, as well as add new tags that might belong to new categories but that were not included as tags in labeled content 122/222;

4. Repeat the actions described in items 2 and 3 above using corrections 124/224 to first automatically annotated content set 134/234. As more tags are generated, the new dataset of tags will have more cases of the known classes and perhaps new classes. As a result, the automated performance of content annotation engine 110/210 will improve.

As the training cycle continues, the QA step results in progressively fewer corrections as the training cycle is repeated, due to improvement in the performance of content annotation engine 110/210 after each training loop traversal. The training cycle may be terminated once a desired level of quality is achieved. An example of a quantitative criterion for determining when such a desired level of quality is achieved may include a corrections threshold number at or above which additional training cycles are performed. However, when the number of corrections to an automatically annotated content set falls below the corrections threshold, training may be deemed complete. Alternatively, or in addition, quantitative criteria for determining when training is complete may include the number of corrected content items, such as videos for example, as a percentage of the total number of content items in the training set, or generation of a predetermined number of tags or annotation classes, for example.

It is noted that the training cycle may be started with no tags and, in one implementation human annotators may be used to determine the initial tags available for application to labeled content 122/222. In some implementations, it may be desirable to limit manual involvement in the training process as much as possible.

According to one implementation of the present disclosure, there is also provided an optimization mechanism to reduce the iterations of the training cycle described above by prioritizing the particular content selected for use in the test sets of content. In one implementation, this is performed by keeping track of statistics relating to content metadata, e.g., file name, title, and so forth, and of content features (i.e. features of the video content itself) such as dominant colors and the numbers of shots in video content, for example. With respect to the expressions "shot" or "shots" of video, it is noted that, as used in the present application, the term "shot" refers to a sequence of frames within a video file that are captured from a unique camera perspective without cuts and/or other cinematic transitions.

Based on statistics relating to the metadata and those features of content trained on in previous cycles, and performing minimal precomputation on content 142/242 available to tag, the content for use in subsequent training cycles as test sets of content can be ranked in order of preference for training purposes. Such statistics can be distances, i.e., minimum or maximum distances, from the centers of clusters of content used during previous training cycles.

For example, the features described above, e.g., file name, number of shots in video content, and so forth, can be used to identify groups or clusters of content used in training. Those clusters of training content can be organized in a table or otherwise located in a training feature space. Each new candidate item of content for use in testing content annotation engine 110/210 may be compared to the existing training clusters by determining its distance from those training clusters. Candidate items of test content having large distances from training clusters may be selected if content annotation engine 110/210 performed well with respect to those training clusters (i.e., test content having very different features from training content is selected when content annotation engine 110/210 is tagging that training content accurately.) Conversely, candidate items of test content having small distances from training clusters may be selected if content annotation engine 110/210 performed poorly with respect to those training clusters (i.e., test content having similar features to training content is selected when content annotation engine 110/210 is generally failing to tag that training content accurately.) The table or other training feature space in which the training clusters are projected can be updated after each testing cycle.

Thus, system 100 may be configured to bias its sampling of training data towards content with features that are different from features it has trained on previously if it is performing well (i.e. ready to handle more diverse or more complicated cases.) Conversely, the system may be configured to bias its sampling towards content with features that are similar or the same as previous cases if it is performing poorly (i.e. still hasn't identified patterns from the previous cases and should continue training on those types of examples.)

Figure 3:
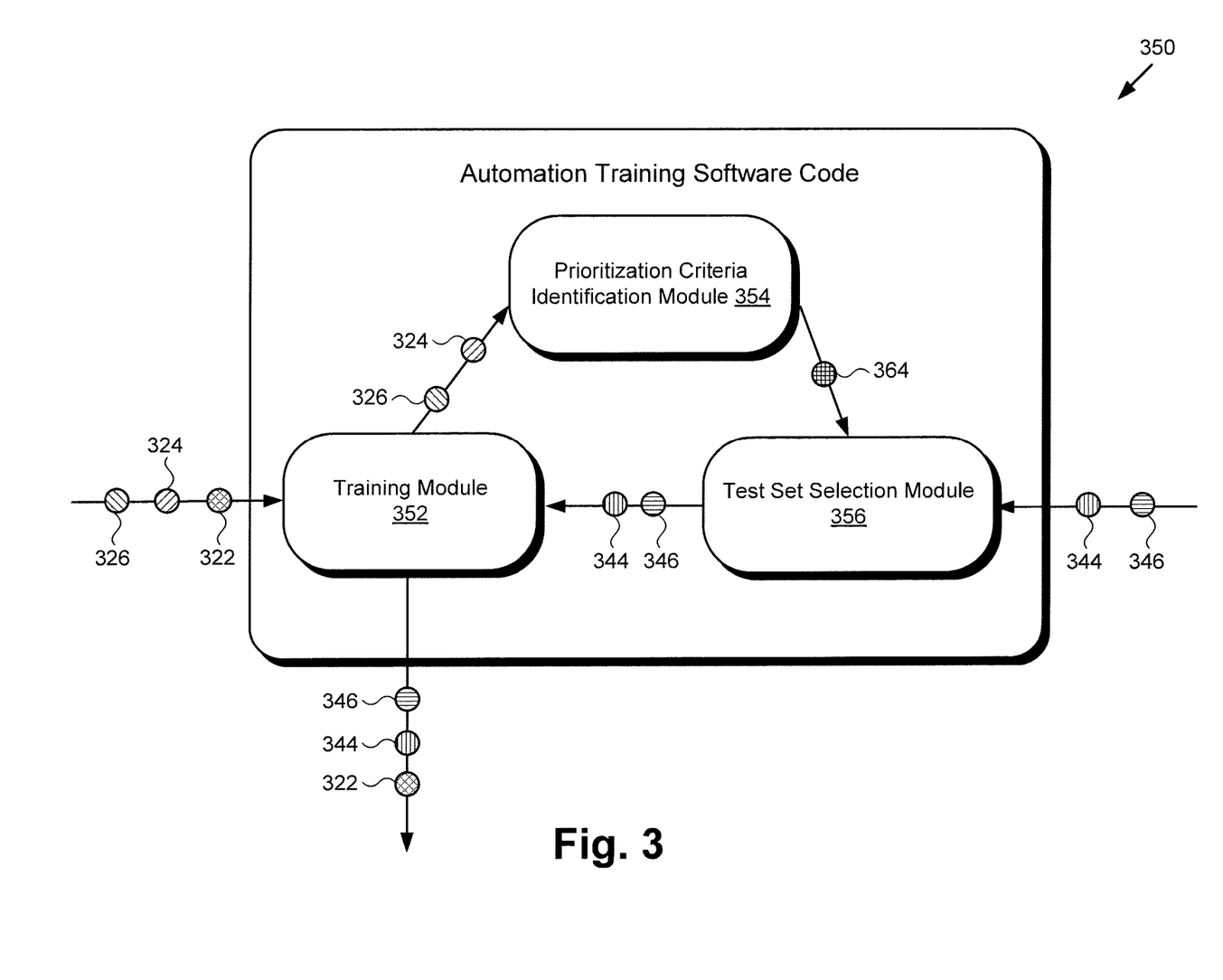
FIG. 3 shows an exemplary diagram of an automation training software code suitable for execution by a hardware processor of the system of FIG. 1, according to one implementation.

Moving to FIG. 3, FIG. 3 shows exemplary automation training software code 350 suitable for execution by hardware processor 104 of system 100, in FIG. 1, according to one implementation. As shown in FIG. 3, automation training software code 350 may include training module 352, prioritization criteria identification module 354, and test set selection module 356. In addition, FIG. 3 shows labeled content 322, corrections 324 to first automatically annotated content set 134/234, corrections 326 to second automatically annotated content set 136/236, first test set 344 of content, and second test set 346 of content. Also shown in FIG. 3 are one or more prioritization criteria 364.

Automation training software code 350 corresponds in general to automation training software code 150/250, in FIGS. 1 and 2, and those corresponding features may share the characteristics attributed to any corresponding feature by the present disclosure. That is to say, like automation training software code 350, automation training software code 150/250 may include features corresponding respectively to training module 352, prioritization criteria identification module 354, and test set selection module 356.

In addition, labeled content 322, first test set 344 of content, and corrections 324 to first automatically annotated content set 134/234, in FIG. 3, correspond respectively to labeled content 122/222, first test set 244 of content, and corrections 124/224 to first automatically annotated content set 134/234, in FIGS. 1 and 2. That is to say, labeled content 322, first test set 344 of content, and corrections 324 to first automatically annotated content set 134/234 may share any of the characteristics attributed to respective labeled content 122/222, first test set 244 of content, and corrections 124/224 to first automatically annotated content set 134/234 by the present disclosure, and vice versa. Moreover, second test set 346 of content and corrections 326 to second automatically annotated content set 136/236 correspond respectively in general to second test set 246 of content and corrections 126/226 to second automatically annotated content set 136/236.

Figure 4:
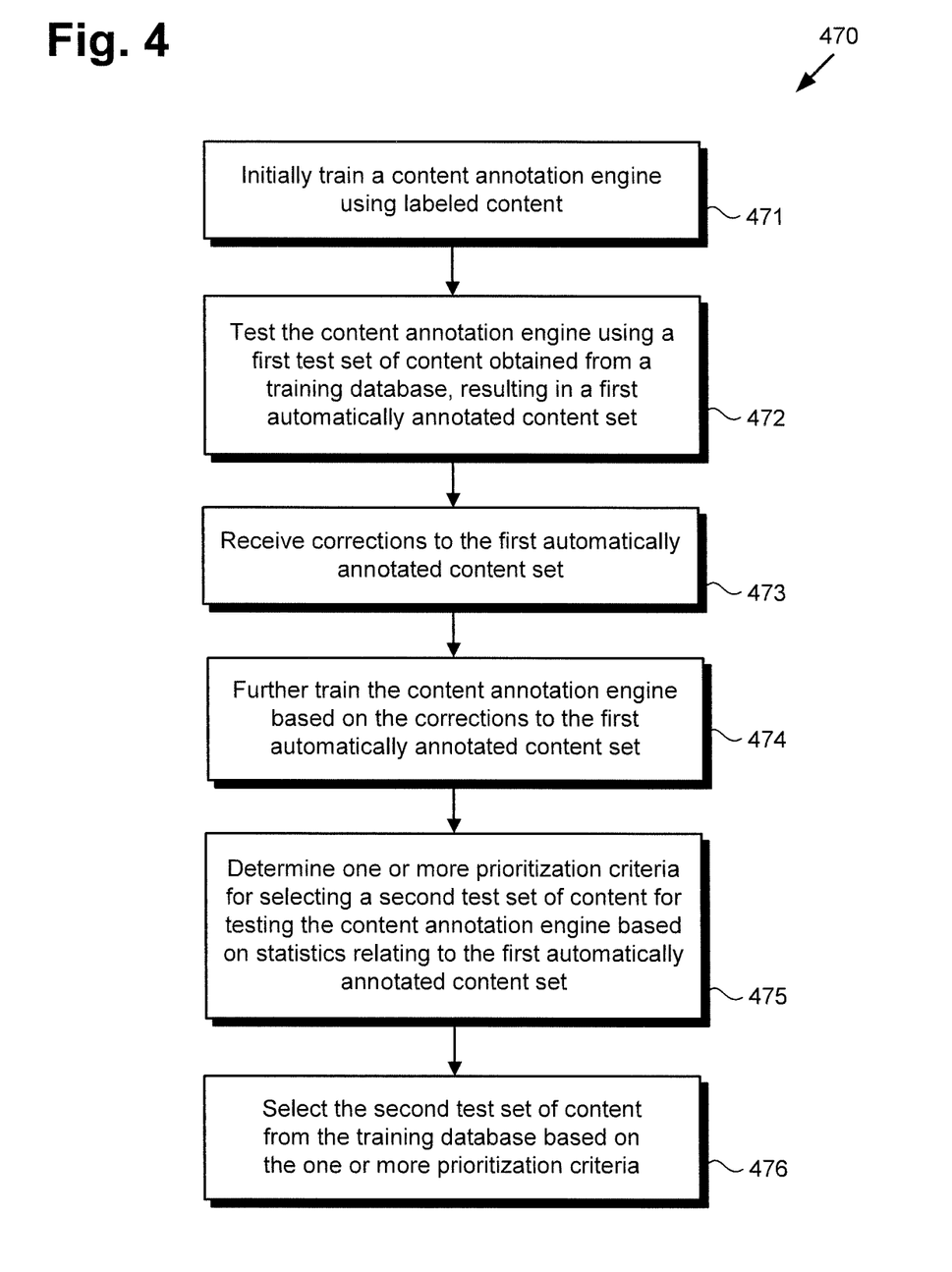
FIG. 4 shows a flowchart presenting an exemplary method for use by a system for automating content annotation, according to one implementation.

The functionality of system 100 including automation training software code 150/250/350 will be further described by reference to FIG. 4 in combination with FIGS. 1, 2, and 3. FIG. 4 shows flowchart 470 presenting an exemplary method for use by a system for automating content annotation, according to one implementation. With respect to the method outlined in FIG. 4, it is noted that certain details and features have been left out of flowchart 470 in order not to obscure the discussion of the inventive features in the present application.

Referring now to FIG. 4 in combination with FIGS. 1, 2, and 3, flowchart 470 begins with initially training content annotation engine 110/210 using labeled content 122/222/322 (action 471.) For example, labeled content 122/222/322 may take the form of content that has been manually annotated or tagged by human annotators. That is to say, labeled content may have been annotated by user 120 and/or one or more human annotators 121. Initial training of content annotation engine 110/210 may be performed by automation training software code 150/250/350, executed by hardware processor 104, and using training module 352.

Labeled content 122/222/322 used to train content annotation engine 110/210 may include any of a wide variety of content types, as well as descriptive annotations or tags associated with that content. For example, the content included in labeled content 122/222/322 may include audio-visual content in the form of episodes or series of television (TV) programming content, movies, video games, or music videos. The tags included as part of labeled content 122/222/322 may be applied by a previously trained automated annotation system, or, as noted above, by user 120 and/or one or more human annotators 121.

Flowchart 470 continues with testing content annotation engine 110/210 using first test set 244/344 of content obtained from training database 112/212, resulting in first automatically annotated content set 134/234 (action 472.) First test set 244/344 of content may be selected from among content 142/242 stored in training database 112/212. It is noted that testing of content annotation engine 110/210 in action 472 includes having content annotation engine 110/210 annotate first test set 244/344 of content in an automated process. The result of that automated annotation of first test set 244/344 of content is first automatically annotated content set 134/234, which includes first test set 244/344 of content as well as the tags applied to first test set 244/344 of content by content annotation engine 110/210.

Content 142/242 from which first test set 244/344 of content is selected may correspond to the type of content included in labeled content 122/222/322 used to initially train content annotation engine 110/210 in action 471. Thus, content 142/242 from which first test set 244/344 of content is selected may include audio-visual content in the form of episodes or series of TV programming content, movies, video games, or music videos. That is to say, in some implementations, first test set 244/344 of content may include video.

It is further noted that training database 112/212 may receive additional content on an ongoing basis. That is to say, the content included in content 142/242 may grow over time. In one implementation, content annotation engine 110/210, once trained, may be used to tag substantially all content stored in training database 112/212.

Testing of content annotation engine 110/210 using first test set 244/344 of content obtained from training database 112/212 may be performed by automation training software code 150/250/350, executed by hardware processor 104, and using training module 352 as well as test set selection module 356. In some implementations, first test set 244/344 of content may be selected using test set selection module 356 of automation training software code 150/250/350 based on a predetermined selection criterion or criteria.

By way of example, in implementations in which content annotation engine 110/210 is used to annotate video, examples of file metadata and features of content 142/342 that may be used for prioritizing content to be selected for first test set 244/344 of content may include:

Metadata:
  Use content file metadata to prioritize location tagging by selecting video content having multiple shots (More camera shots in content results in a higher probability of presenting different locations or the same location from different angles to content annotation engine 110/210.)
  Use content file metadata to maximize diversity (different video recording dates, different show titles, file names, etc.)
Object, character, and other video features:
  Select content with different illumination levels as this could be due to different stages of post-production
  Select content with different dominant colors (in order to pick videos recorded with different cameras)
  Select content with different camera shot types (based on face detection or recognition of other objects)

Flowchart 470 continues with receiving corrections 124/224/324 to first automatically annotated content set 134/234 (action 473.) In some implementations, corrections 124/224/324 to first automatically annotated content set 134/234 (hereinafter "corrections 124/224/324") may include manual annotations by one or more human annotators, such as user 120 and/or one or more annotators 121. However, in other implementations, corrections 124/224/324 may include annotations generated by one or more other automated annotation systems.

As noted above, the QA process resulting in corrections 124/224/324 may include acceptance, or correction in the form or modification or rejection of the tags applied to first test set 244/344 of content by content annotation engine 110/210 and included in first automatically annotated content set 134/234. As further noted above, in some implementations, corrections 124/224/324 may include new annotation tags not included in labeled content 122/222/322 used to initially train content annotation engine 110/210. As shown in FIG. 3, corrections 124/224/324 may be received by automation training software code 150/250/350, executed by hardware processor 104, and using training module 352.

Flowchart 470 continues with further training content annotation engine 110/210 based on corrections 124/224/324 to first automatically annotated content set 134/234 (action 474.) Further training of content annotation engine 110/210 based on corrections 124/224/324 may be performed by automation training software code 150/250/350, executed by hardware processor 104, and using training module 352. In one implementation, for example, corrections 124/224/324 may be used to provide feedback to training module 352 of automation training software code 150/250/350 in a machine learning process, which may prevent content annotation engine 110/210 from repeating the errors resulting in corrections 124/224/324 and may also allow the content annotation engine 110/210 to learn new correlations between video features and new tags provided through the corrections 124/224/324.

Flowchart 470 continues with determining one or more prioritization criteria 364 for selecting second test set 246/346 of content for testing content annotation engine 110/210 based on statistics relating to first automatically annotated content set 134/234 (action 475.) Examples of statistics relating to first automatically annotated content set 134/234 include one or more of: (1) an evaluation of content features, such as video features, in first automatically annotated content set 134/234, (2) an evaluation of metadata in first automatically annotated content set 134/234, and (3) corrections 124/224/324 to first automatically annotated content set 134/234.

Prioritization criteria 364 may include content metadata and/or other characteristic features of the content. For example, in implementations in which first test set 244/344 of content includes video, prioritization criteria 364 may be content metadata in the form of a filename of the content, a creation or modification date of the content, a time or frame duration of the video, a source of the video, a recording place of the video, a postproduction process of the video, and a resolution of the video. It is noted that such content metadata may be included with content 142/342 and stored in training database 112/212.

Other examples of prioritization criteria 364 of may be the number of shots included in the video and/or the duration of one or more shots included in the video. Alternatively, or in addition, prioritization criteria 364 may be the number of faces detected in one or more shots of the video and/or the variety of faces detected in the one or more shots and/or an estimation of movement in the one or more shots.

As yet another example, prioritization criteria 364 may be the illumination level, or brightness, of one or more shots of the video, and/or a dominant color detected in the one or more shots. Like the content metadata discussed above, any of the characteristic features described above may be identified by descriptive data included with content 142/342 and stored in training database 112/212. Determination of one or more prioritization criteria 364 for selecting second test set 246/346 of content based on corrections 124/224/324 may be performed by automation training software code 150/250/350, executed by hardware processor 104, and using prioritization criteria identification module 354.

Flowchart 470 continues with selecting second test set 246/346 of content from training database 112/212 based on prioritization criteria 364 (action 476.) Like first test 244/344 of content, second test set 246/346 of content is selected from content 142/242 stored in training database 112/212. Content 142/242 from which second test set 246/346 of content is selected may correspond to the type of content included in labeled content 122/222/322 used to initially train content annotation engine 110/210 in action 471. Thus, content 142/242 from which second test set 246/346 of content is selected may include audio-visual content in the form of episodes or series of TV programming content, movies, video games, or music videos. That is to say, in some implementations, second test set 246/346 of content may include video.

Selection of second test set 246/346 of content based on prioritization criteria 364 may be performed by automation training software code 150/250/350, executed by hardware processor 104, and using test set selection module 356. Basing the selection of second test set 246/346 of content on prioritization criteria 364 identified in action 475 implements the optimization mechanism described above with reference to FIGS. 1 and 2. Thus, the number of iterations of the virtuous training cycle required to make content annotation engine 110/210 more robust is reduced and substantially minimized by prioritizing the particular content selected for use in second test set 246/346 of content, as well as any subsequent test sets. That prioritization may be performed by keeping track of the content metadata and other descriptive data included with content 142/342 and stored in training database 112/212. Based on that content metadata and other descriptive data, the content for use in second test set 246/346 of content can be ranked in order of preference for training purposes.

The content metadata and other descriptive data associated with first test set 244/344 of content included in first automatically annotated content set 134/234 to which corrections 124/224/324 are applied may be used to statistically keep track of the content used for training. The resulting statistics may be used to select second test set 246/346 of content for testing content annotation engine 110/210. It is noted that the present performance status of content annotation engine 110/210 is known based on corrections 124/224/324. For example, when corrections 124/224/324 are numerous, it means that content annotation engine 110/210 is making many errors. As another example, when corrections 124/224/324 include many new tags, it suggests that content annotation engine 110/210 still has to learn new categories.

Correlating the feedback provided by corrections 124/224/324 with the content metadata and other descriptive data associated with the particular content to which corrections 124/224/324 have been applied can also serve to identify which of content 142/242 to prioritize for testing and training purposes. By way of example, in implementations in which content annotation engine 110/210 is used to annotate video, examples of prioritization criteria 364 that may be used for selecting second test set 246/346 of content may include:

| Video Details | Prioritization |
|---|---|
| All features completely different when compared with features included in labeled content 122/222/322 used to initially train content annotation engine 110/210. | yes |
| Videos with features f1, f2, . . . fn equal to the features included in labeled content 122/222/322 used to initially train content annotation engine 110/210 when those features are handled well by content annotation engine 110/210 as shown by corrections 124/224/324. | no |
| Videos with features f1, f2, . . . fn equal to the features included in labeled content 122/222/322 used to initially train content annotation engine 110/210 when those features are not handled well by content annotation engine 110/210 as shown by corrections 124/224/324 (i.e., when content annotation engine 110/210 is performing poorly.) | yes |

Based on the above prioritization criteria, for example, second test set 246/346 of content may be selected from content 142/242 stored in training database 112/212, and may be used to test content annotation engine 110/210 after the further training performed in action 474. It is noted that the testing of content annotation engine 110/210 includes having content annotation engine 110/210 annotate second test set 246/346 of content in an automated process. The result of that automated annotation of second test set 246/346 of content is second automatically annotated content set 136/236, which includes second test set 246/346 of content as well as the tags applied to second test set 246/346 of content by content annotation engine 110/210.

Testing of content annotation engine 110/210 using second test set 246/346 may be followed by another QA stage in which corrections 126/226/326 to second automatically annotated content set 136/236 are received by automation training software code 150/250/350 and used to further train content annotation engine 110/210. In addition, corrections 126/226/326 to second automatically annotated content set 136/236 can be used to determine further prioritization criteria for selection of a subsequent test set of content. For example, hardware processor 104 may further execute the automation training software code 150/250/350 to repeatedly test and train content annotation engine 110/210 over multiple cycles, using prioritization criteria for selecting test sets of content in subsequent cycles based on statistics obtained from one, two, several, or all previous cycles. That process of testing, receiving corrections, and further training can continue until the automated performance of content annotation engine 110/210 is satisfactory or meets a certain satisfactory threshold.

Thus, the present application discloses systems and methods for automating content annotation. The automation solution disclosed by the present application initially trains a content annotation engine using a set of labeled content, such as a set of manually annotated video files, for example. The content annotation engine is then tested using a first test set of content obtained from a training database, resulting in a first automatically annotated content set. The present solution also includes receiving corrections to the first automatically annotated content set and further training the content annotation engine based on those corrections. Moreover, by determining prioritization criteria for selecting a second test set of content for testing the content annotation engine based on statistics relating to the first automatically annotated content set, the present solution advantageously enables rapid improvement in the automated performance by the content annotation engine.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for automating content annotation, the system comprising:
    a computing platform including a hardware processor and a system memory;
    an automation training software code stored in the system memory;
    the hardware processor configured to execute the automation training software code to:
        initially train a content annotation engine using a labeled content;
        test the content annotation engine using a first test set of content obtained from a training database, resulting in a first automatically annotated content set;
        receive one or more corrections to the first automatically annotated content set;
        further train the content annotation engine based on the one or more corrections to the first automatically annotated content set;
        determine at least one prioritization criteria based on statistics relating to the first automatically annotated content set;
        select a second test set of content from the training database based on the at least one prioritization criteria; and
        test the content annotation engine using the second test set of content selected based on the at least one prioritization criteria, resulting in a second automatically annotated content set.

2. The system of claim 1, wherein the statistics relating to the first automatically annotated content set include at least one of an evaluation of content features in the first automatically annotated content set, an evaluation of metadata in the first automatically annotated content set, or the one or more corrections to the first automatically annotated content set.

3. The system of claim 1, wherein the one or more corrections to the first automatically annotated content set comprise manual annotations by at least one human annotator.

4. The system of claim 1, wherein the hardware processor is further configured to execute the automation training software code to:
    repeatedly test and further train the content annotation engine over a plurality of cycles, and wherein the at least one prioritization criteria for selecting a test set of content in a subsequent cycle is based on statistics obtained from at least one previous cycle.

5. The system of claim 1, wherein the first test set of content and the second test set of content comprise one or more videos, and wherein the at least one prioritization criteria comprise at least one of a number of shots included in the one or more videos or a duration of one or more shots included in the one or more videos.

6. The system of claim 1, wherein the first test set of content and the second test set of content comprise one or more videos, and wherein the at least one prioritization criteria comprise at least one of a number of faces detected in one or more shots included in the one or more videos, a variety of faces detected in one or more shots included in the one or more videos, or an estimation of movement in one or more shots included in the one or more videos.

7. The system of claim 1, wherein the first test set of content and the second test set of content comprise one or more videos, and wherein the at least one prioritization criteria comprise at least one of an illumination level of one or more shots included in the one or more videos or a dominant color detected in one or more shots included in the one or more videos.

8. The system of claim 1, wherein the first test set of content and the second test set of content comprise one or more videos, and wherein the at least one prioritization criteria comprise content metadata including at least one of a filename of the one or more videos, one of a creation or modification date of the one or more videos, one of a time duration of the one or more videos or a frame duration of the one or more videos, a source of the one or more videos, a recording place of the one or more videos, a postproduction process of the one or more videos, or a resolution of the one or more videos.

9. A system for automating content annotation, the system comprising:
    a computing platform including a hardware processor and a system memory;
    an automation training software code stored in the system memory;

the hardware processor configured to execute the automation training software code to:
  initially train a content annotation engine using a labeled content;
  test the content annotation engine using a first test set of content obtained from a training database, resulting in a first automatically annotated content set;
  receive one or more corrections to the first automatically annotated content set;
  further train the content annotation engine based on the one or more corrections to the first automatically annotated content set;
  determine at least one prioritization criteria based on statistics relating to the first automatically annotated content set; and
  select a second test set of content from the training database based on the at least one prioritization criteria;
  wherein selecting the second test set of content from the training database comprises one of selecting content having features different from features used to train the content annotation engine, or selecting content having substantially similar features to features used to train the content annotation engine if the content annotation engine is performing below a satisfactory threshold.

10. A system for automating content annotation, the system comprising:
  a computing platform including a hardware processor and a system memory;
  an automation training software code stored in the system memory;
  the hardware processor configured to execute the automation training software code to:
    initially train a content annotation engine using a labeled content;
    test the content annotation engine using a first test set of content obtained from a training database, resulting in a first automatically annotated content set;
    receive one or more corrections to the first automatically annotated content set;
    further train the content annotation engine based on the one or more corrections to the first automatically annotated content set;
    determine at least one prioritization criteria based on statistics relating to the first automatically annotated content set; and
    select a second test set of content from the training database based on the at least one prioritization criteria;
    wherein the one or more corrections to the first automatically annotated content set comprise new annotation tags not included in the annotated content used to initially train the content annotation engine.

11. A system for automating content annotation, the system comprising:
  a computing platform including a hardware processor and a system memory;
  an automation training software code stored in the system memory;
  the hardware processor configured to execute the automation training software code to:
    initially train a content annotation engine using a labeled content;
    test the content annotation engine using a first test set of content obtained from a training database, resulting in a first automatically annotated content set;
    receive one or more corrections to the first automatically annotated content set;
    further train the content annotation engine based on the one or more corrections to the first automatically annotated content set;
    determine at least one prioritization criteria based on statistics relating to the first automatically annotated content set; and
    select a second test set of content from the training database based on the at least one prioritization criteria;
    wherein the first test set of content and the second test set of content comprise video one or more videos, and wherein the at least one prioritization criteria comprise at least one of:
      a number of shots included in the one or more videos,
      a duration of one or more shots included in the one or more videos,
      a number of faces detected in one or more shots included in the one or more videos,
      a variety of faces detected in one or more shots included in the one or more videos,
      an estimation of movement in one or more shots included in the one or more videos,
      an illumination level of one or more shots included in the one or more videos,
      a dominant color detected in one or more shots included in the one or more videos,
      a filename of the one or more videos,
      one of a creation or modification date of the one or more videos,
      one of a time duration of the one or more videos or a frame duration of the one or more videos,
      a source of the one or more videos,
      a recording place of the one or more videos,
      a postproduction process of the one or more videos, or
      a resolution of the one or more videos.

12. A method for use by a system for automating content annotation that includes a computing platform having a hardware processor and a system memory storing an automation training software code, the method comprising:
  initially training, by the automation training software code executed by the hardware processor, a content annotation engine using a labeled content;
  testing, by the automation training software code executed by the hardware processor, the content annotation engine using a first test set of content obtained from a training database, resulting in a first automatically annotated content set;
  receiving, by the automation training software code executed by the hardware processor, one or more corrections to the first automatically annotated content set;
  further training, by the automation training software code executed by the hardware processor, the content annotation engine based on the one or more corrections to the first automatically annotated content set;
  determining, by the automation training software code executed by the hardware processor, at least one prioritization criteria based on statistics relating to the first automatically annotated content set;
  selecting, by the automation training software code executed by the hardware processor, a second test set of content from the training database based on the at least one prioritization criteria; and testing, by the automation training software code executed by the hardware processor, the content annotation engine using the second test set of content selected based on the at least one prioritization criteria, resulting in a second automatically annotated content set.

13. The method of claim 12, wherein the statistics relating to the first automatically annotated content set include at least one of an evaluation of content features in the first automatically annotated content set, an evaluation of metadata in the first automatically annotated content set, or the one or more corrections to the first automatically annotated content set.

14. The method of claim 12, wherein the one or more corrections to the first automatically annotated content set comprise manual annotations by at least one human annotator.

15. The method of claim 12, further comprising repeatedly testing and further training the content annotation engine, by the automation training software code executed by the hardware processor, over a plurality of cycles, wherein the at least one prioritization criteria for selecting a test set of content in a subsequent cycle is based on statistics obtained from at least one previous cycle.

16. The method of claim 12, wherein the first test set of content and the second test set of content comprise one or more videos, and wherein the at least one prioritization criteria comprise at least one of a number of shots included in the one or more videos or a duration of one or more shots included in the one or more videos.

17. The method of claim 12, wherein the first test set of content and the second test set of content comprise one or more videos, and wherein the at least one prioritization criteria comprise at least one of a number of faces detected in one or more shots included in the one or more videos, a variety of faces detected in one or more shots included in the one or more videos, or an estimation of movement in one or more shots included in the one or more videos.

18. The method of claim 12, wherein the first test set of content and the second test set of content comprise one or more videos, and wherein the at least one prioritization criteria comprise at least one of an illumination level of one or more shots of included in the one or more videos or a dominant color detected in one or more shots included in the one or more videos.

19. The method of claim 12, wherein the first test set of content and the second test set of content comprise one or more videos, and wherein the at least one prioritization criteria comprise content metadata including at least one of a filename of the one or more videos, one of a creation or modification date of the one or more videos, one of a time duration of the one or more videos or a frame duration of the one or more videos, a source of the one or more videos, a recording place of the one or more videos, a postproduction process of the one or more videos, or a resolution of the one or more videos.

20. A method for use by a system for automating content annotation that includes a computing platform having a hardware processor and a system memory storing an automation training software code, the method comprising:
   initially training, by the automation training software code executed by the hardware processor, a content annotation engine using a labeled content;
   testing, by the automation training software code executed by the hardware processor, the content annotation engine using a first test set of content obtained from a training database, resulting in a first automatically annotated content set;
   receiving, by the automation training software code executed by the hardware processor, one or more corrections to the first automatically annotated content set;
   further training, by the automation training software code executed by the hardware processor, the content annotation engine based on the one or more corrections to the first automatically annotated content set;
   determining, by the automation training software code executed by the hardware processor, at least one prioritization criteria based on statistics relating to the first automatically annotated content set; and
   selecting, by the automation training software code executed by the hardware processor, a second test set of content from the training database based on the at least one prioritization criteria;
   wherein selecting the second test set of content from the training database comprises one of selecting content having features different from features used to train the content annotation engine, or selecting content having substantially similar features to features used to train the content annotation engine if the content annotation engine is performing below a satisfactory threshold.

21. A method for use by a system for automating content annotation that includes a computing platform having a hardware processor and a system memory storing an automation training software code, the method comprising:
   initially training, by the automation training software code executed by the hardware processor, a content annotation engine using a labeled content;
   testing, by the automation training software code executed by the hardware processor, the content annotation engine using a first test set of content obtained from a training database, resulting in a first automatically annotated content set;
   receiving, by the automation training software code executed by the hardware processor, one or more corrections to the first automatically annotated content set;
   further training, by the automation training software code executed by the hardware processor, the content annotation engine based on the one or more corrections to the first automatically annotated content set;
   determining, by the automation training software code executed by the hardware processor, at least one prioritization criteria based on statistics relating to the first automatically annotated content set; and
   selecting, by the automation training software code executed by the hardware processor, a second test set of content from the training database based on the at least one prioritization criteria;
   wherein the one or more corrections to the first automatically annotated content set comprise new annotation tags not included in the annotated content used to initially train the content annotation engine.

22. A method for use by a system for automating content annotation that includes a computing platform having a hardware processor and a system memory storing an automation training software code, the method comprising:
   initially training, by the automation training software code executed by the hardware processor, a content annotation engine using a labeled content;
   testing, by the automation training software code executed by the hardware processor, the content annotation engine using a first test set of content obtained from a training database, resulting in a first automatically annotated content set;

receiving, by the automation training software code executed by the hardware processor, one or more corrections to the first automatically annotated content set;

further training, by the automation training software code executed by the hardware processor, the content annotation engine based on the one or more corrections to the first automatically annotated content set;

determining, by the automation training software code executed by the hardware processor, at least one prioritization criteria based on statistics relating to the first automatically annotated content set; and selecting, by the automation training software code executed by the hardware processor, a second test set of content from the training database based on the at least one prioritization criteria;

wherein the first test set of content and the second test set of content comprise video one or more videos, and wherein the at least one prioritization criteria comprise at least one of:
a number of shots included in the one or more videos,
a duration of one or more shots included in the one or more videos,
a number of faces detected in one or more shots included in the one or more videos,
a variety of faces detected in one or more shots included in the one or more videos,
an estimation of movement in one or more shots included in the one or more videos,
an illumination level of one or more shots included in the one or more videos,
a dominant color detected in one or more shots included in the one or more videos,
a filename of the one or more videos,
one of a creation or modification date of the one or more videos,
one of a time duration of the one or more videos or a frame duration of the one or more videos,
a source of the one or more videos,
a recording place of the one or more videos,
a postproduction process of the one or more videos, or
a resolution of the one or more videos.

23. A computer-readable non-transitory medium having stored thereon an automation training software code, which when executed by a hardware processor, instantiates a method comprising:
initially training a content annotation engine using a labeled content;
testing the content annotation engine using a first test set of content obtained from a training database, resulting in a first automatically annotated content set;
receiving one or more corrections to the first automatically annotated content set;
further training the content annotation engine based on the one or more corrections to the first automatically annotated content set;
determining at least one prioritization criteria based on statistics relating to the first automatically annotated content set;
selecting a second test set of content from the training database based on the at least one prioritization criteria; and
testing the content annotation engine using the second test set of content selected based on the at least one prioritization criteria, resulting in a second automatically annotated content set.

24. The computer-readable non-transitory medium of claim 23, wherein the statistics relating to the first automatically annotated content set include at least one of an evaluation of content features in the first automatically annotated content set, an evaluation of metadata in the first automatically annotated content set, or the one or more corrections to the first automatically annotated content set.

25. The computer-readable non-transitory medium of claim 23, wherein the one or more corrections to the first automatically annotated content set comprise manual annotations by at least one human annotator.

26. The computer-readable non-transitory medium of claim 23, wherein the one or more corrections to the first automatically annotated content set comprise new annotation tags not included in the annotated content used to initially train the content annotation engine.

27. The computer-readable non-transitory medium of claim 23, wherein the first test set of content and the second test set of content comprise one or more videos, and wherein the at least one prioritization criteria comprise at least one of:
a number of shots included in the one or more videos,
a duration of one or more shots included in the one or more videos,
a number of faces detected in one or more shots included in the one or more videos,
a variety of faces detected in one or more shots included in the one or more videos,
an estimation of movement in one or more shots included in the one or more videos,
an illumination level of one or more shots included in the one or more videos,
a dominant color detected in one or more shots included in the one or more videos,
a filename of the one or more videos,
one of a creation or modification date of the one or more videos,
one of a time duration of the one or more videos or a frame duration of the one or more videos,
a source of the one or more videos,
a recording place of the one or more videos,
a postproduction process of the one or more videos, or
a resolution of the one or more videos.

* * * * *